USO10906539B2

(12) United States Patent
Yang et al.

(10) Patent No.: US 10,906,539 B2
(45) Date of Patent: Feb. 2, 2021

(54) AUTOMATIC DRIVING NAVIGATION METHOD, APPARATUS, AND SYSTEM, IN-VEHICLE TERMINAL, AND SERVER

(71) Applicant: Huawei Technologies Co., Ltd., Shenzhen (CN)

(72) Inventors: Zhihua Yang, Beijing (CN); Hui Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 288 days.

(21) Appl. No.: 15/991,864

(22) Filed: May 29, 2018

(65) Prior Publication Data
US 2018/0273032 A1 Sep. 27, 2018

Related U.S. Application Data

(63) Continuation of application No. PCT/CN2015/096016, filed on Nov. 30, 2015.

(51) Int. Cl.
*B60W 30/12* (2020.01)
*G06F 16/29* (2019.01)
(Continued)

(52) U.S. Cl.
CPC ............ *B60W 30/12* (2013.01); *G01C 21/00* (2013.01); *G01C 21/3415* (2013.01);
(Continued)

(58) Field of Classification Search
CPC ...................................... G06F 16/29
See application file for complete search history.

(56) References Cited

U.S. PATENT DOCUMENTS 5,926,117 A * 7/1999 Gunji ...................... G01S 19/04
340/988
6,343,247 B2 * 1/2002 Jitsukata ................ G01C 21/26
180/168

(Continued)

FOREIGN PATENT DOCUMENTS

CN     1760930 A    4/2006
CN   101033978 A    9/2007
(Continued)

OTHER PUBLICATIONS

Stephenson, S., et al., "Implementation of V2X with the Integration of Network RTK: Challenges and solutions," XP056008469, Proceedings of the 25th International Technical Meeting of the Satellite Division of the Institute of Navigation (ION GNSS), Sep. 17-21, 2012, pp. 1556-1567.

(Continued)

*Primary Examiner* — Alex C Dunn
(74) *Attorney, Agent, or Firm* — Hauptman Ham, LLP

(57) ABSTRACT

An automatic driving navigation method, apparatus, and system, an in-vehicle terminal, and a server are provided. The method includes obtaining, by an in-vehicle terminal, satellite positioning data of a vehicle, receiving a differential positioning correction from a radio base station in a wireless network, and correcting the satellite positioning data using the differential positioning correction to obtain a high-precision location of the vehicle; providing, by the server, a lane level planning driving route to the in-vehicle terminal according to the high-precision location provided by the in-vehicle terminal and with reference to high-precision map information; and controlling, by the in-vehicle terminal according to the obtained high-precision location, the vehicle to automatically drive according to the lane level planning driving route. A satellite differential positioning technology based on wireless network assistance can be (Continued)

used, and round-the-clock and all-road-condition automatic driving navigation is implemented.

11 Claims, 8 Drawing Sheets

(51) Int. Cl.
    *G01C 21/00*     (2006.01)
    *G01C 21/34*     (2006.01)
    *G01C 21/36*     (2006.01)
    *G01S 19/43*     (2010.01)
    *G01S 5/00*     (2006.01)
    *G01S 19/42*     (2010.01)
    *G05D 1/00*     (2006.01)
    *G05D 1/02*     (2020.01)

(52) U.S. Cl.
    CPC .......... *G01C 21/3658* (2013.01); *G01S 5/009* (2013.01); *G01S 5/0054* (2013.01); *G01S 19/42* (2013.01); *G01S 19/43* (2013.01); *G05D 1/0088* (2013.01); *G05D 1/0278* (2013.01); *G05D 1/0285* (2013.01); *G06F 16/29* (2019.01); *G05D 2201/0213* (2013.01)

(56) References Cited

U.S. PATENT DOCUMENTS

| | | | |
|---|---|---|---|
| 6,532,417 | B2 | 3/2003 | Hatano |
| 7,190,281 | B2 * | 3/2007 | Nagasawa ................ B60R 1/00 340/435 |
| 7,274,988 | B2 * | 9/2007 | Mukaiyama ....... B60K 31/0008 701/301 |
| 8,909,388 | B1 * | 12/2014 | Kim .................... B60W 40/076 701/1 |
| 9,076,338 | B2 * | 7/2015 | Taguchi ................ B60W 30/12 |
| 9,261,881 | B1 * | 2/2016 | Ferguson .............. B60W 30/10 |
| 9,335,766 | B1 * | 5/2016 | Silver ................ G06K 9/00805 |
| 9,766,344 | B2 * | 9/2017 | Ichinokawa ............ G01S 19/22 |
| 2011/0066312 | A1 | 3/2011 | Sung et al. |
| 2014/0278052 | A1 | 9/2014 | Slavin et al. |
| 2014/0288827 | A1 | 9/2014 | Iwasawa et al. |
| 2016/0280235 | A1 * | 9/2016 | Sugaiwa .............. G05D 1/0061 |
| 2018/0208199 | A1 * | 7/2018 | Fujita ....................... G08G 1/16 |

FOREIGN PATENT DOCUMENTS

| | | |
|---|---|---|
| CN | 101751794 A | 6/2010 |
| CN | 102402864 A | 4/2012 |
| CN | 104267721 A | 1/2015 |
| JP | H113499 A | 1/1999 |
| JP | 2006350089 A | 12/2006 |
| JP | 2008232760 A | 10/2008 |
| JP | 2011064490 A | 3/2011 |
| JP | 2014185925 A | 10/2014 |
| JP | 2015145849 A | 8/2015 |

OTHER PUBLICATIONS

Foreign Communication From a Counterpart Application, European Application No. 15909470.5, Extended European Search Report dated Nov. 21, 2018, 11 pages.
Machine Translation and Abstract of Japanese Publication No. JP2006350089, Dec. 28, 2006, 37 pages.
Machine Translation and Abstract of Japanese Publication No. JP2008232760, Oct. 2, 2008, 19 pages.
Machine Translation and Abstract of Japanese Publication No. JP2011064490, Mar. 31, 2011, 19 pages.
Machine Translation and Abstract of Japanese Publication No. JP2015145849, Aug. 13, 2015, 37 pages.
Foreign Communication From a Counterpart Application, Japanese Application No. 2018-527938, Japanese Notice of Rejection dated Jun. 25, 2019, 4 pages.
Foreign Communication From a Counterpart Application, Japanese Application No. 2018-527938, English Translation of Japanese Notice of Rejection dated Jun. 25, 2019, 5 pages.
Machine Translation and Abstract of Chinese Publication No. CN1760930, Apr. 19, 2006, 7 pages.
Machine Translation and Abstract of Chinese Publication No. CN101033978, Sep. 12, 2007, 5 pages.
Machine Translation and Abstract of Chinese Publication No. CN101751794, Jun. 23, 2010, 5 pages.
Machine Translation and Abstract of Chinese Publication No. CN102402864, Apr. 4, 2012, 7 pages.
Machine Translation and Abstract of Chinese Publication No. CN104267721, Jan. 7, 2015, 5 pages.
Foreign Communication From a Counterpart Application, PCT Application No. PCT/CN2015/096016, English Translation of International Search Report dated Aug. 10, 2016, 2 pages.

* cited by examiner

AUTOMATIC DRIVING NAVIGATION METHOD, APPARATUS, AND SYSTEM, IN-VEHICLE TERMINAL, AND SERVER

CROSS-REFERENCE TO RELATED APPLICATIONS

This application is a continuation of International Application No. PCT/CN2015/096016, filed on Nov. 30, 2015, the disclosure of which is hereby incorporated by reference in its entirety.

TECHNICAL FIELD

The present disclosure relates to the field of automatic driving technologies, and in particular, to an automatic driving navigation method, apparatus, and system, an in-vehicle terminal, and a server.

BACKGROUND

With development of an Internet of Things technology, and with a problem such as casualty, congestion, or low efficiency that exists in conventional transportation becoming increasingly serious, an automatic driving technology has become a focus of research.

In an existing automatic driving navigation method, a 64-line lidar and a three-dimensional (3D) high-precision map are used to implement vehicle positioning and navigation. A specific solution includes obtaining rough location information of a vehicle using a conventional Global Positioning System (GPS) technology; scanning in real time using the 64-line lidar to obtain a 3D image of a fixed object such as a building or a landmark in a line-of-sight range around the vehicle; afterwards, obtaining, according to the rough location information and from an image pre-stored in the 3D high-precision map, a 3D image in an area in which the vehicle is located; matching the 3D image obtained from the 3D high-precision map and the 3D image collected using the 64-line lidar; and calculating a high-precision location of the vehicle, thereby implementing lane level positioning and navigation on the vehicle.

However, the prior art has at least the following problems: (1) The 64-line lidar has a relatively high requirement for an environment condition, a detection effect is seriously affected in bad weather such as rain, snow, fog, or haze, and round-the-clock positioning and navigation cannot be implemented. (2) The fixed object such as the building or the landmark in an actual environment usually changes. If the image stored in the 3D high-precision map is not updated in a timely manner, positioning precision is affected.

SUMMARY

To resolve the foregoing problems that the prior art cannot implement round-the-clock positioning and navigation and positioning precision is affected because a 3D high-precision map has a difficulty in effectively adapting to an environment change, embodiments of the present disclosure provide an automatic driving navigation method, apparatus, and system, an in-vehicle terminal, and a server. Technical solutions are as follows.

According to a first aspect, an automatic driving navigation method is provided, where the method includes sending, by a radio base station in a wireless network, a differential positioning correction to an in-vehicle terminal; obtaining, by the in-vehicle terminal, satellite positioning data of a vehicle, and correcting the satellite positioning data using the differential positioning correction to obtain a high-precision location of the vehicle; sending, by the in-vehicle terminal, the high-precision location to a server; receiving, by the server, the high-precision location from the in-vehicle terminal, and determining a lane level planning driving route according to the high-precision location and with reference to high-precision map information; sending, by the server, the lane level planning driving route to the in-vehicle terminal; and controlling, by the in-vehicle terminal according to the obtained high-precision location, the vehicle to automatically drive according to the lane level planning driving route. The high-precision location is location information whose positioning precision reaches a submeter level. The lane level planning driving route is a route that is accurate to the submeter level and that is used to enable the vehicle to drive on a specified lane. The high-precision map information is used to provide information required for lane level route planning.

An in-vehicle terminal corrects satellite positioning data of a vehicle using a differential positioning correction received from a radio base station in a wireless network in order to obtain a high-precision location of the vehicle, obtains a lane level planning driving route of the vehicle according to the high-precision location and by interacting with a server, and controls, according to the obtained high-precision location, the vehicle to automatically drive according to the lane level planning driving route. This resolves problems that the prior art cannot implement round-the-clock positioning and navigation and positioning precision is affected because a 3D high-precision map has a difficulty in effectively adapting to an environment change. The high-precision location of the vehicle is obtained using a satellite differential positioning technology based on wireless network assistance. Positioning can be performed in various weather conditions, and round-the-clock and all-road-condition automatic driving navigation is implemented. In addition, the positioning precision does not need to rely on the 3D high-precision map, so that adaptability and reliability of the entire solution are significantly improved.

In a first possible implementation of the first aspect, the receiving, by the server, the high-precision location from the in-vehicle terminal, and determining a lane level planning driving route according to the high-precision location and with reference to high-precision map information includes receiving, by the server, a start location and a destination location of the vehicle from the in-vehicle terminal, where the start location is determined by the in-vehicle terminal according to the high-precision location; and determining, by the server, the lane level planning driving route according to the start location, the destination location, and the high-precision map information. The high-precision map information includes static information and dynamic information, the static information includes information that is used to indicate a static distribution status of a road, a lane, and road infrastructure in a road network environment, and the dynamic information includes information that is used to indicate a real-time road condition of the road and the lane in the road network environment.

Because the prior art is a single vehicle automatic driving navigation solution, and a perception range is limited to only a line-of-sight range, centralized scheduling and management cannot be performed according to a traffic condition, and problems of traffic congestion and low efficiency cannot be resolved. However, in the first possible implementation of the first aspect, when the server performs route planning, the perception range is expanded from the line-of-sight range to an all road network range by integrating the dynamic information, thereby implementing comprehensive vehicle scheduling of an entire city and helping resolve a traffic congestion problem in the city. In addition, compared with the prior art, information provided in a high-precision map does not need to include a 3D image of a fixed object such as a building or a landmark in an environment, and the server needs to maintain only a two-dimensional (2D) high-precision map. A map capacity is reduced, and map complexity is significantly decreased.

With reference to the first possible implementation of the first aspect, in a second possible implementation of the first aspect, the determining, by the server, the lane level planning driving route according to the start location, the destination location, and the high-precision map information includes determining, by the server, a road level planning driving route according to the start location, the destination location, and information that is in the high-precision map information and that is related to road planning, where the road level planning driving route is a route that is used to enable the vehicle to drive on a specified road; and determining, by the server, the lane level planning driving route according to the road level planning driving route and information that is in the high-precision map information and that is related to lane planning.

With reference to the first possible implementation of the first aspect, in a third possible implementation of the first aspect, the method further includes obtaining, by the server, update information of the dynamic information; determining, by the server, an affected road and/or lane according to the update information of the dynamic information; determining, by the server, a target vehicle according to the lane level planning driving route and high-precision location of each vehicle; and redetermining, by the server, a start location of the target vehicle according to a high-precision location of the target vehicle, and performing a step of determining a lane level planning driving route according to the start location, the destination location, and high-precision map information again. The target vehicle is a vehicle that needs to pass but has not passed the affected road and/or lane.

Using the foregoing manner, a problem such as congestion or block can be effectively prevented from occurring on the vehicle, thereby helping the vehicle reach a destination in a timely manner.

With reference to any one of the first aspect or the possible implementations of the first aspect, in a fourth possible implementation of the first aspect, the differential positioning correction is obtained by means of solving by a central station according to real-time kinematic (RTK) observed values obtained by at least three reference stations and is provided to the radio base station. A manner of deploying the central station and the RTK reference stations has the following three possible cases: 1. The central station and each RTK reference station are deployed in the wireless network. 2. The central station is deployed in the wireless network and each RTK reference station is deployed outside the wireless network. 3. The central station and each RTK reference station are deployed outside the wireless network.

According to a current continuously operating reference station (CORS) network condition, a CORS network capacity is relatively small, a usage requirement of a large quantity of common users cannot be met, and the CORS network is usually open to a professional user such as a bureau of surveying and mapping and is not open to a common user. Therefore, compared with obtaining the high-precision location by directly using the CORS network, obtaining the high-precision location of the vehicle using the satellite differential positioning technology based on wireless network assistance can fully meet the usage requirement of the large quantity of common users and enhance feasibility of implementation of the solution.

With reference to any one of the first aspect or the possible implementations of the first aspect, in a fifth possible implementation of the first aspect, the controlling, by the in-vehicle terminal according to the obtained high-precision location, the vehicle to automatically drive according to the lane level planning driving route includes generating, by the in-vehicle terminal, a vehicle control command according to the obtained high-precision location and the lane level planning driving route. The vehicle control command is used to control an actual driving route of the vehicle to constantly fit the lane level planning driving route.

According to a second aspect, an automatic driving navigation method is provided, and the method is applied to an in-vehicle terminal. For steps included in the method, refer to steps on an in-vehicle terminal side in the automatic driving navigation method provided in the first aspect.

According to a third aspect, an automatic driving navigation method is provided, and the method is applied to a server. For steps included in the method, refer to steps on a server side in the automatic driving navigation method provided in the first aspect.

According to a fourth aspect, an automatic driving navigation apparatus is provided, and the apparatus is applied to an in-vehicle terminal. Functional modules included in the apparatus are configured to implement the automatic driving navigation method provided in the second aspect.

According to a fifth aspect, an automatic driving navigation apparatus is provided, and the apparatus is applied to a server. Functional modules included in the apparatus are configured to implement the automatic driving navigation method provided in the third aspect.

According to a sixth aspect, an automatic driving navigation system is provided, where the system includes an in-vehicle terminal, a wireless network, and a server. The in-vehicle terminal and the server establish a communication connection using the wireless network. The wireless network includes at least one radio base station. The radio base station is configured to obtain a differential positioning correction and send the differential positioning correction to the in-vehicle terminal. The in-vehicle terminal is configured to obtain satellite positioning data of a vehicle, receive the differential positioning correction from the radio base station, and correct the satellite positioning data using the differential positioning correction to obtain a high-precision location of the vehicle, where the high-precision location is location information whose positioning precision reaches a submeter level. The in-vehicle terminal is further configured to send the high-precision location to the server. The server is configured to receive the high-precision location from the in-vehicle terminal, and determine a lane level planning driving route according to the high-precision location and with reference to high-precision map information. The lane level planning driving route is a route that is accurate to the submeter level and that is used to enable the vehicle to drive on a specified lane, and the high-precision map information is used to provide information required for lane level route planning. The server is further configured to send the lane level planning driving route to the in-vehicle terminal. The in-vehicle terminal is further configured to receive the lane level planning driving route from the server, and control, according to the obtained high-precision location, the vehicle to automatically drive according to the lane level planning driving route.

In a possible implementation of the sixth aspect, the radio base station is further configured to obtain the differential positioning correction from a central station. The central station is configured to obtain the differential positioning correction by means of solving according to RTK observed values obtained by at least three RTK reference stations. The central station and each RTK reference station are deployed in the wireless network, or the central station is deployed in the wireless network and each RTK reference station is deployed outside the wireless network, or the central station and each RTK reference station are deployed outside the wireless network.

According to a seventh aspect, an in-vehicle terminal is provided, where the in-vehicle terminal includes a processor and a memory. The memory is configured to store one or more instructions, the instruction is configured to be executed by the processor, and the instruction is used to implement the automatic driving navigation method provided in the second aspect.

According to an eighth aspect, a server is provided, where the server includes a processor and a memory. The memory is configured to store one or more instructions, the instruction is configured to be executed by the processor, and the instruction is used to implement the automatic driving navigation method provided in the third aspect.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

FIG. 3A-1 and FIG. 3A-2 are a flowchart of an automatic driving navigation method according to another embodiment of the present disclosure;

DESCRIPTION OF EMBODIMENTS

To make the objectives, technical solutions, and advantages of the present disclosure clearer, the following further describes the embodiments of the present disclosure in detail with reference to the accompanying drawings.

Figure 1:
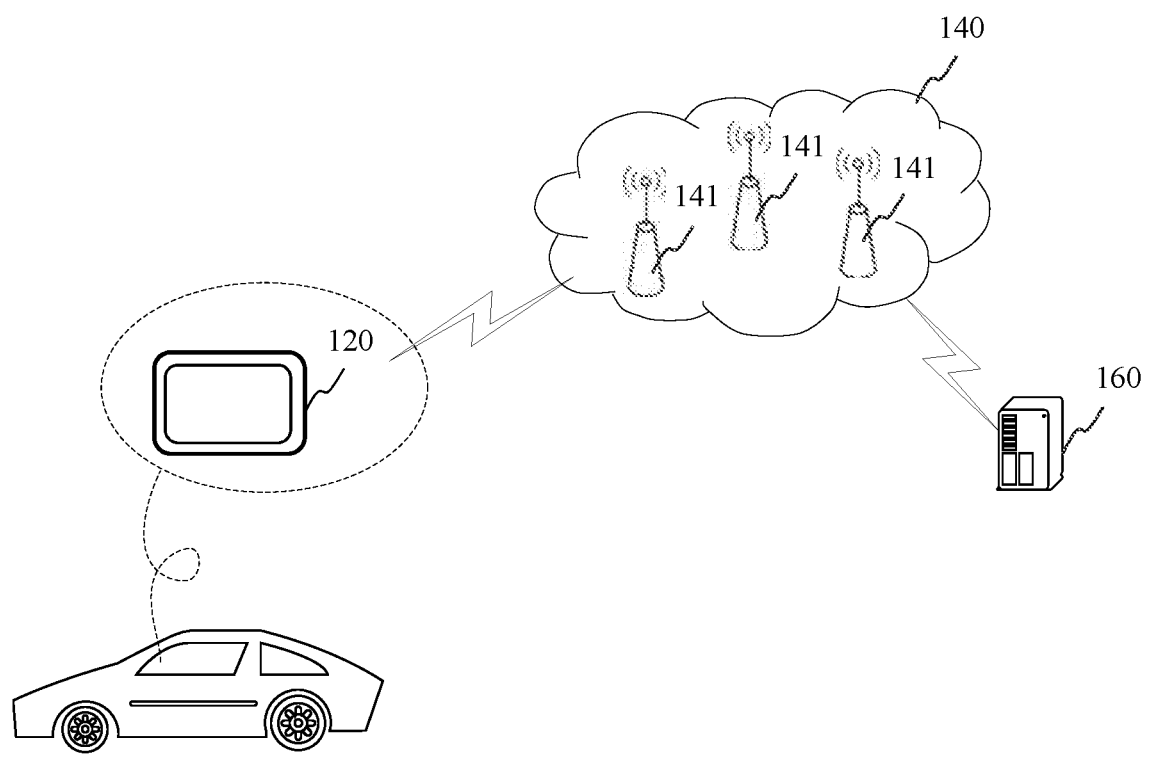
FIG. 1 is a schematic diagram of an implementation environment according to an embodiment of the present disclosure.

Referring to FIG. 1, FIG. 1 shows a schematic diagram of an implementation environment according to an embodiment of the present disclosure. The implementation environment includes an in-vehicle terminal 120, a wireless network 140, and a server 160.

The in-vehicle terminal 120 is a user side device and is disposed in a vehicle. The in-vehicle terminal 120 has a positioning function. The in-vehicle terminal 120 includes a Global Navigation Satellite System (GNSS) receiver, and the GNSS receiver obtains satellite positioning data of the vehicle. The in-vehicle terminal 120 is further configured to receive a differential positioning correction from a radio base station 141 in the wireless network 140, and correct, using the differential positioning correction, the satellite positioning data obtained by the GNSS receiver to obtain a high-precision location of the vehicle. The high-precision location is location information whose positioning precision reaches a submeter level. The differential positioning correction is generally an RTK correction. In a possible implementation, the GNSS receiver is a receiver that has an RTK function. The GNSS receiver receives the RTK correction from the radio base station 141 in the wireless network 140, and corrects the satellite positioning data using the RTK correction to obtain the high-precision location of the vehicle. In addition, in this embodiment of the present disclosure, the in-vehicle terminal may include one or both of two devices of an intelligent front-end device equipped in the vehicle and a terminal device independent of the vehicle. The intelligent front-end device equipped in the vehicle is structurally integrated into the vehicle and is a part of the vehicle. The terminal device independent of the vehicle is, for example, a mobile phone.

The wireless network 140 includes several radio base stations 141. The wireless network 140 is different from an existing wireless network. A functional module that is configured to assist the in-vehicle terminal 120 in implementing vehicle positioning is added to the radio base station 141. The functional module is configured to receive the differential positioning correction from a central station and send the differential positioning correction to the in-vehicle terminal 120 in a cell in which the radio base station 141 is located. The central station is a device that has a data calculation and processing capability. The central station is configured to obtain an RTK observed value from each RTK reference station, and obtain the differential positioning correction by means of solving according to RTK observed values obtained by at least three RTK reference stations. A manner of deploying the central station and the RTK reference stations has the following three possible cases: 1. The central station and each RTK reference station are deployed in the wireless network 140. 2. The central station is deployed in the wireless network 140 and each RTK reference station is deployed outside the wireless network 140. 3.

The central station and each RTK reference station are deployed outside the wireless network 140.

The server 160 is a network side device. The server 160 may be one server, or may be a server cluster including several servers, or a cloud computing service center. In this embodiment of the present disclosure, the server 160 maintains a 2D high-precision map. High-precision map information provided in the 2D high-precision map includes static information and dynamic information.

The static information includes information that is used to indicate a static distribution status of a road, a lane, and road infrastructure in a road network environment. The following briefly describes concepts of the road and the lane in this embodiment of the present disclosure and a relationship between the road and the lane. The road is a passageway that is for the vehicle to drive and that is used to connect two places. The lane is a passageway for a single column vehicle that drives along a same direction to drive. A commonly-seen lane includes different types such as a straight lane, a left turn lane, and a right turn lane. One road includes one or more lanes. For example, one road includes four lanes: one left turn lane, two straight lanes, and one right turn lane. The static information includes but is not limited to road static information, lane static information, and road infrastructure information. The road static information is used to indicate a static distribution status of the road in the road network environment. For example, the road static information includes information such as road geometry, road curvature, a road heading, a road speed limit, a quantity of lanes, a longitudinal gradient, and a transverse gradient. The lane static information is used to indicate a static distribution status of the lane in the road network environment. For example, the lane static information includes information such as lane geometry, lane curvature, a lane heading, a lane central axis, a lane width, a lane marking, a lane speed limit, lane segmentation, and lane merging. The road infrastructure information is used to indicate a road infrastructure condition in the road network environment. For example, the road infrastructure information includes information about road infrastructure such as a curbstone, a guardrail, a tunnel, a traffic sign, a toll station, a traffic signal light, a steering arrow, and a rail. The road infrastructure is generally located in the middle or on both sides of the road.

The dynamic information includes information that is used to indicate a real-time road condition of the road and the lane in the road network environment. For example, the dynamic information includes but is not limited to road dynamic information and lane dynamic information. The road dynamic information is used to indicate a real-time road condition of the road in the road network environment, and the lane dynamic information is used to indicate a real-time road condition of the lane in the road network environment. Optionally, the dynamic information further includes availability information and/or weather information. The availability information includes information that is used to indicate a real-time availability status of the road and the lane in the road network environment. For example, the availability information includes information such as a traffic accident status, a road construction status, a road closure status, a lane closure status, and traffic management and control. The weather information includes information that is used to indicate a real-time weather condition and/or a future weather condition of each place in the road network environment.

In addition, the wireless network 140 further has a function of implementing communication between the in-vehicle terminal 120 and the server 160. The in-vehicle terminal 120 and the server 160 establish a communication connection using the wireless network 140. The wireless network 140 may be any wireless network based on a communications technology standard, such as a Long Term Evolution (LTE) wireless network.

Figure 2:
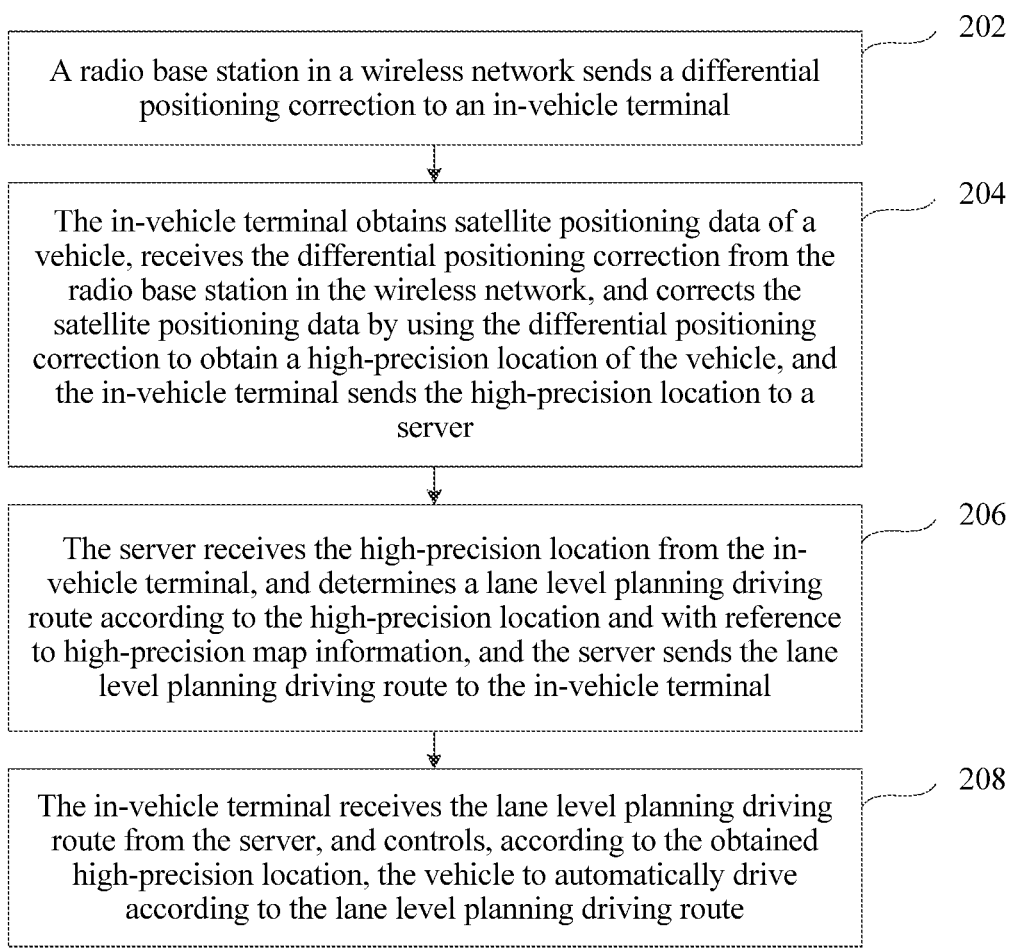
FIG. 2 is a flowchart of an automatic driving navigation method according to an embodiment of the present disclosure.

Referring to FIG. 2, FIG. 2 shows a flowchart of an automatic driving navigation method according to an embodiment of the present disclosure. The automatic driving navigation method may be applied to an implementation environment shown in FIG. 1. The automatic driving navigation method may include the following several steps.

Step 202: A radio base station in a wireless network sends a differential positioning correction to an in-vehicle terminal.

Step 204: The in-vehicle terminal obtains satellite positioning data of a vehicle, receives the differential positioning correction from the radio base station in the wireless network, and corrects the satellite positioning data using the differential positioning correction to obtain a high-precision location of the vehicle, and the in-vehicle terminal sends the high-precision location to a server.

The high-precision location is location information whose positioning precision reaches a submeter level.

Step 206: The server receives the high-precision location from the in-vehicle terminal, and determines a lane level planning driving route according to the high-precision location and with reference to high-precision map information, and the server sends the lane level planning driving route to the in-vehicle terminal.

The lane level planning driving route is a route that is accurate to the submeter level and that is used to enable the vehicle to drive on a specified lane. The high-precision map information is used to provide information required for lane level route planning.

Step 208: The in-vehicle terminal receives the lane level planning driving route from the server, and controls, according to the obtained high-precision location, the vehicle to automatically drive according to the lane level planning driving route.

In conclusion, according to the automatic driving navigation method provided in this embodiment, an in-vehicle terminal corrects satellite positioning data of a vehicle using a differential positioning correction received from a radio base station in a wireless network in order to obtain a high-precision location of the vehicle, obtains a lane level planning driving route of the vehicle according to the high-precision location and by interacting with a server, and controls, according to the obtained high-precision location, the vehicle to automatically drive according to the lane level planning driving route. This resolves problems that the prior art cannot implement round-the-clock positioning and navigation and positioning precision is affected because a 3D high-precision map has a difficulty in effectively adapting to an environment change. The high-precision location of the vehicle is obtained using a satellite differential positioning technology based on wireless network assistance. Positioning can be performed in various weather conditions, and round-the-clock and all-road-condition automatic driving navigation is implemented. In addition, the positioning precision does not need to rely on the 3D high-precision map, so that adaptability and reliability of the entire solution are significantly improved.

Figures 1, 3A:
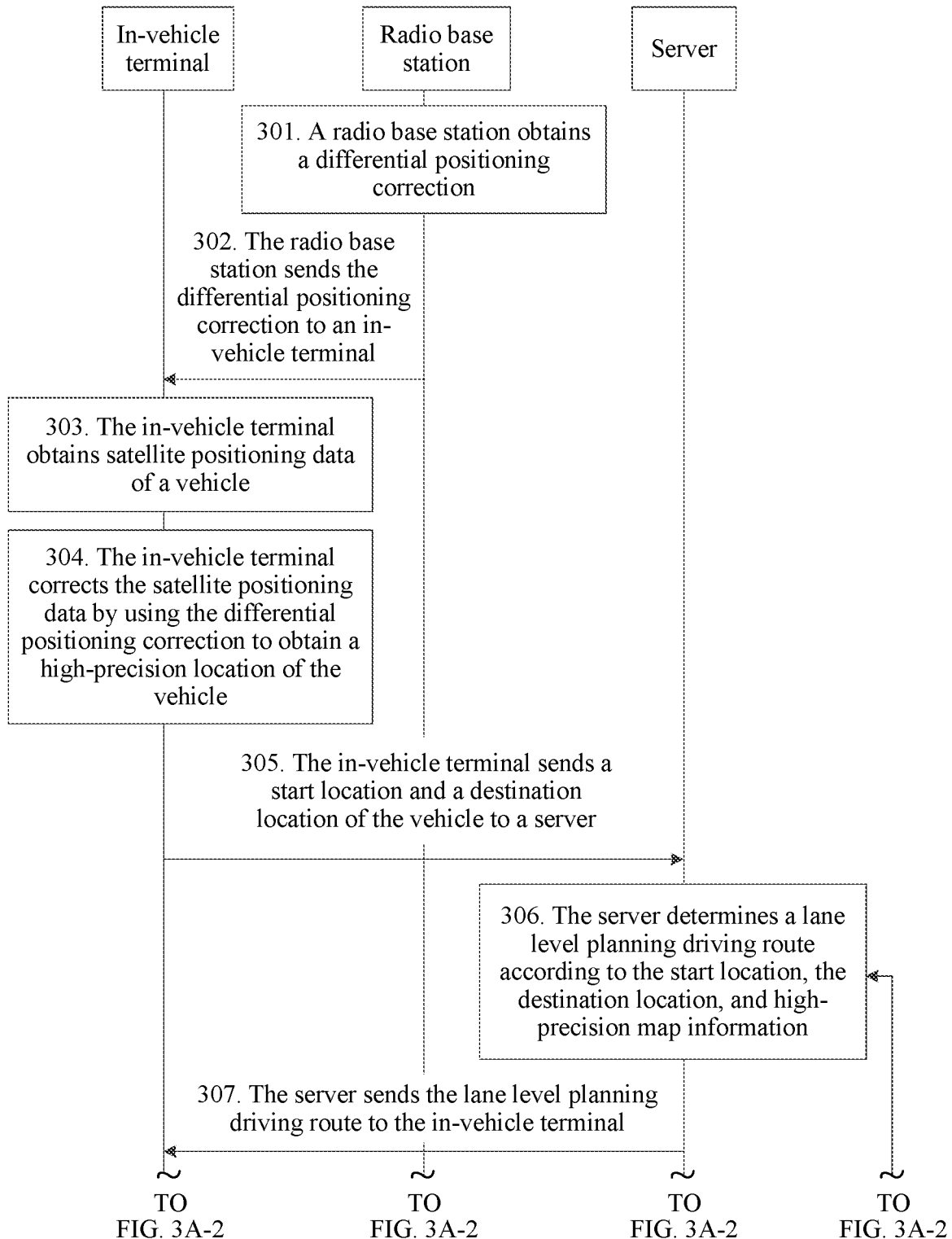
Figures 2, 3A:
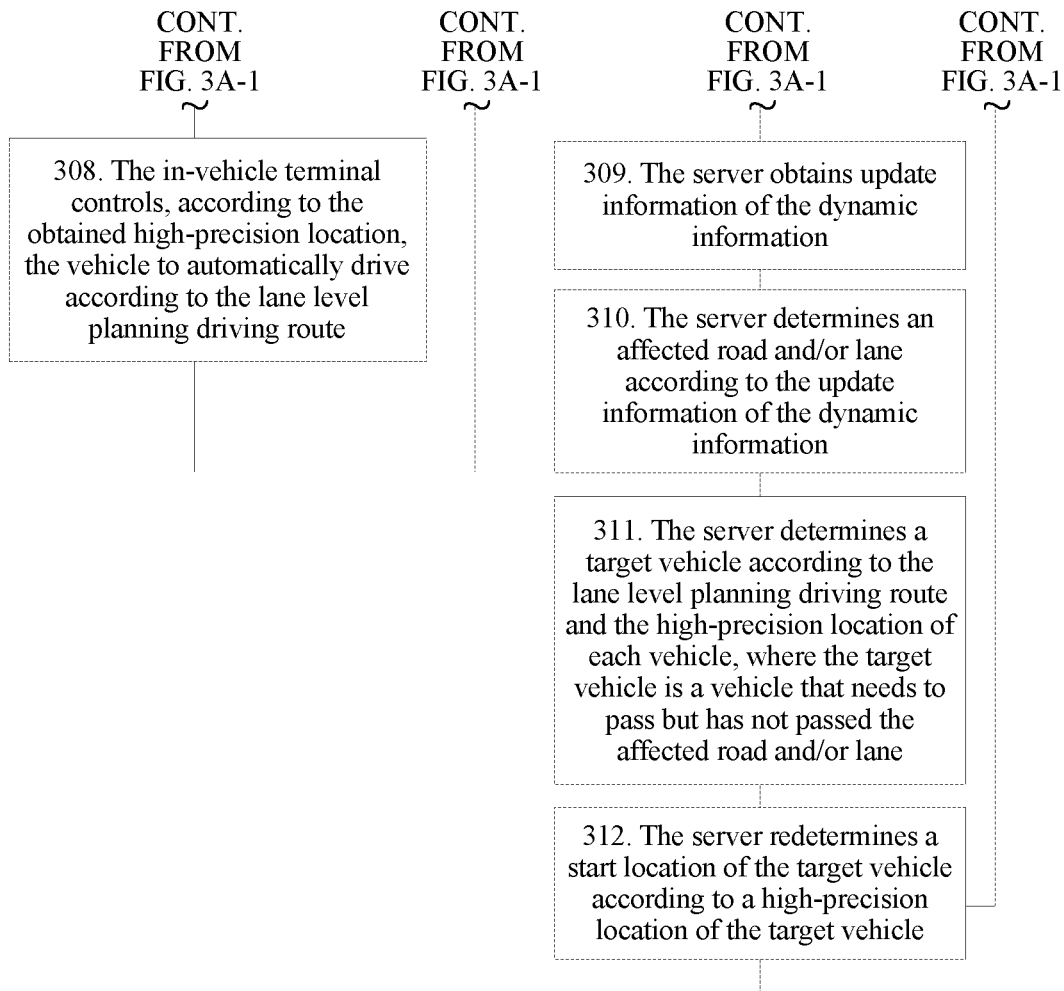

Referring to FIG. 3A-1 and FIG. 3A-2, FIG. 3A-1 and FIG. 3A-2 show a flowchart of an automatic driving navigation method according to another embodiment of the present disclosure. In this embodiment, an example in which the automatic driving navigation method is applied to an implementation environment shown in FIG. 1 is used for description. The automatic driving navigation method may include the following several steps.

Step 301: A radio base station obtains a differential positioning correction.

Step 302: The radio base station sends the differential positioning correction to an in-vehicle terminal.

Correspondingly, the in-vehicle terminal receives the differential positioning correction from the radio base station.

In this embodiment of the present disclosure, a wireless network is different from an existing wireless network. A functional module that is configured to assist the in-vehicle terminal in implementing vehicle positioning is added to the radio base station in the wireless network. The functional module is configured to receive the differential positioning correction from a central station and send the differential positioning correction to the in-vehicle terminal in a cell in which the radio base station is located.

Step 302 includes the following two possible implementations. In a possible implementation, the in-vehicle terminal actively requests to obtain the differential positioning correction from the radio base station, the in-vehicle terminal sends a correction obtaining request to the radio base station, and the radio base station sends a last obtained differential positioning correction to the in-vehicle terminal in response to the correction obtaining request. In another possible implementation, the radio base station broadcasts, at a predetermined time interval, the differential positioning correction to each in-vehicle terminal in the cell in which the radio base station is located. Two adjacent predetermined time intervals may be the same or may be different.

The differential positioning correction is generally an RTK correction. In a possible implementation, a GNSS receiver equipped in the in-vehicle terminal is a receiver that has an RTK function, and the GNSS receiver receives the RTK correction from the radio base station in the wireless network.

In addition, the central station is a device that has a data calculation and processing capability. The central station is configured to obtain an RTK observed value from each RTK reference station, and obtain the differential positioning correction by means of solving according to RTK observed values obtained by at least three RTK reference stations.

A manner of deploying the central station and the RTK reference stations has the following three possible cases.

1. The central station and each RTK reference station are deployed in the wireless network. In a possible implementation, the central station is deployed in a core network of the wireless network, and the RTK reference station is deployed in all or some radio base stations. In another possible implementation, the central station is deployed in the radio base station, and the RTK reference station is deployed in all or some radio base stations.

2. The central station is deployed in the wireless network and each RTK reference station is deployed outside the wireless network. For example, the central station may be deployed in a core network of the wireless network or in the radio base station, and the RTK reference station may be deployed in a CORS network.

3. The central station and each RTK reference station are deployed outside the wireless network. For example, the central station and each RTK reference station are deployed in a CORS network.

In addition, in this embodiment of the present disclosure, a quantity of central stations is not specifically limited. For example, there may be one central station, or there may be multiple central stations and the multiple central stations are deployed in a distributed manner.

Step 303: The in-vehicle terminal obtains satellite positioning data of a vehicle.

The in-vehicle terminal obtains the satellite positioning data of the vehicle using the GNSS receiver.

Step 304: The in-vehicle terminal corrects the satellite positioning data using the differential positioning correction to obtain a high-precision location of the vehicle.

The high-precision location is location information whose positioning precision reaches a submeter level.

In this embodiment of the present disclosure, the high-precision location of the vehicle is obtained using a satellite differential positioning technology based on wireless network assistance. The high-precision location whose precision reaches above the submeter level can be obtained in order to provide assurance for implementing lane level positioning and navigation. In addition, according to a current CORS network condition, a CORS network capacity is relatively small, a usage requirement of a large quantity of common users cannot be met, and the CORS network is usually open to a professional user such as a bureau of surveying and mapping and is not open to a common user. Therefore, compared with obtaining the high-precision location by directly using the CORS network, obtaining the high-precision location of the vehicle using the satellite differential positioning technology based on wireless network assistance can fully meet the usage requirement of the large quantity of common users and enhance feasibility of implementation of the solution.

Step 305: The in-vehicle terminal sends a start location and a destination location of the vehicle to a server.

Obtaining the start location and the destination location of the vehicle is a prerequisite for implementing route planning. The start location may be determined according to the high-precision location, and a current location that is of the vehicle and that is obtained by positioning is used as the start location. The destination location is provided by a user, and the user may input the destination location in an interaction interface provided by the in-vehicle terminal.

The in-vehicle terminal sends the start location and the destination location of the vehicle to the server using the wireless network. Correspondingly, the server receives the start location and the destination location of the vehicle from the in-vehicle terminal. In a possible implementation, the in-vehicle terminal actively requests route planning from the server. The in-vehicle terminal sends a route planning request to the server, and the route planning request includes at least the start location and the destination location of the vehicle.

Optionally, the route planning request further includes identification information. Different identification information is used to distinguish vehicles with different identifiers. For example, the identification information may be a device identifier of the in-vehicle terminal, or may be a user account for logging in to the in-vehicle terminal, or may be a unique identifier of the vehicle, or another preset identifier.

Optionally, the route planning request further includes heading information. The heading information is used to indicate a current heading of the vehicle, that is, a forward direction of a head of the vehicle. The heading information may be obtained using an in-vehicle sensor.

Optionally, the route planning request further includes route constraint information. The route constraint information is a constraint provided by the user for route planning. For example, when the route constraint information is used to instruct the server to plan a driving route from the start location to the destination location, the driving route needs to pass a target location specified by the user. For another example, the route constraint information is used to instruct the server to plan a driving route with a shortest distance.

Step 306: The server determines a lane level planning driving route according to the start location, the destination location, and high-precision map information.

The server maintains the high-precision map information. The high-precision map information includes static information and dynamic information.

The static information includes information that is used to indicate a static distribution status of a road, a lane, and road infrastructure in a road network environment. For example, the static information includes but is not limited to road static information, lane static information, and road infrastructure information. The road static information is used to indicate a static distribution status of the road in the road network environment. For example, the road static information includes information such as road geometry, road curvature, a road heading, a road speed limit, a quantity of lanes, a longitudinal gradient, and a transverse gradient. The lane static information is used to indicate a static distribution status of the lane in the road network environment. For example, the lane static information includes information such as lane geometry, lane curvature, a lane heading, a lane central axis, a lane width, a lane marking, a lane speed limit, lane segmentation, and lane merging. The road infrastructure information is used to indicate a road infrastructure condition in the road network environment. For example, the road infrastructure information includes information about road infrastructure such as a curbstone, a guardrail, a tunnel, a traffic sign, a toll station, a traffic signal light, a steering arrow, and a rail. The road static information, the lane static information, and the road infrastructure information may be collected and recorded in advance by a technical person and be updated and maintained by the technical person.

The dynamic information includes information that is used to indicate a real-time road condition of the road and the lane in the road network environment. For example, the dynamic information includes but is not limited to road dynamic information and lane dynamic information. The road dynamic information is used to indicate a real-time road condition of the road in the road network environment, such as a road traffic status or a traffic signal light status of each road. The lane dynamic information is used to indicate a real-time road condition of the lane in the road network environment, such as a lane traffic status or a traffic signal light status of each lane. The road traffic status and the lane traffic status may be determined by collecting statistics according to the high-precision location that is of the vehicle and that is reported by each in-vehicle terminal in real time in an all road network range. In a possible implementation, the traffic signal light status may be obtained from a traffic management agency using a data interface provided by the traffic management agency, and the traffic signal light status may be updated in a timely manner if a change occurs. In another possible implementation, the server controls the traffic signal light status, for example, the server controls a traffic signal light status of each intersection according to the real-time road condition of each road and each lane, and the server provides, using the data interface provided by the traffic management agency, control information that is used to indicate the traffic signal light status to the traffic management agency, so that the traffic management agency controls a traffic signal light of each intersection according to the control information.

Optionally, the dynamic information further includes availability information and/or weather information. The availability information includes information that is used to indicate a real-time availability status of the road and the lane in the road network environment. For example, the availability information includes information such as a traffic accident status, a road construction status, a road closure status, a lane closure status, and traffic management and control. The availability information may be obtained from the traffic management agency using the data interface provided by the traffic management agency, or may be obtained by means of collection in real time using a camera deployed in each road section, or may be obtained by means of collection using the in-vehicle sensor (such as a camera) of each vehicle. The weather information includes information that is used to indicate a real-time weather condition and/or a future weather condition of each place in the road network environment. The weather information may be obtained from a meteorological agency using a data interface provided by the meteorological agency, and the weather information may be updated in a timely manner if a change occurs. In a possible implementation, the server adjusts other dynamic information according to the weather information, for example, adjusts the road speed limit, a closed road, or the like according to the weather information.

In a further embodiment, step 306 includes the following substeps.

First, the server determines a road level planning driving route according to the start location, the destination location, and information that is in the high-precision map information and that is related to road planning.

The information that is in the high-precision map information and that is related to road planning includes the road static information and the road dynamic information, and optionally, further includes the road infrastructure information, the availability information, the weather information, and the like. The road level planning driving route is a route that is used to enable the vehicle to drive on a specified road.

In a possible implementation, this step includes determining at least one alternative road level planning driving route according to the start location, the destination location, and the road static information; when there is one alternative road level planning driving route, determining the alternative road level planning driving route as the road level planning driving route of the vehicle; and when there are multiple alternative road level planning driving routes, separately calculating, according to a route distance and road dynamic information that are corresponding to each alternative road level planning driving route, estimated driving time corresponding to each alternative road level planning driving route, and selecting an alternative road level planning driving route with minimum estimated driving time as the road level planning driving route of the vehicle. In a process of road level route planning, by considering the road dynamic information including the road traffic status and the like, a route planning solution with a highest speed and highest efficiency can be provided to the user, and a planned road level planning driving route is more appropriate and efficient, in order to prevent a case in which the user cannot reach a destination for a long time due to a factor such as traffic congestion.

Figure 3B:
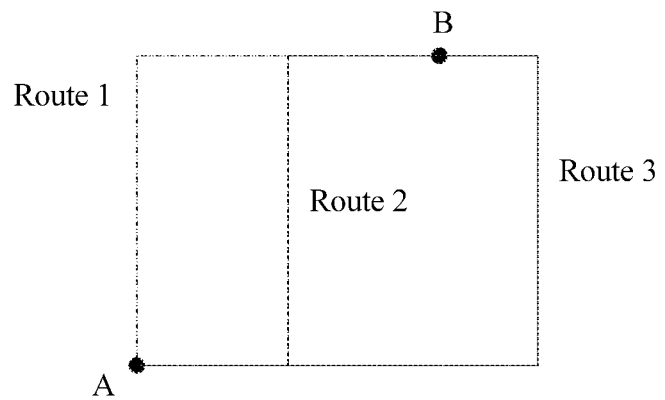
FIG. 3B is a schematic diagram of road level route planning according to an embodiment shown in FIG. 3A-1 and FIG. 3A-2.

For example, with reference to FIG. 3B, it is assumed that there are three alternative road level planning driving routes, which are respectively a route 1, a route 2, and a route 3, between a start location A and a destination location B. The server separately calculates, according to the route distance and the road dynamic information that are corresponding to each alternative road level planning driving route, the estimated driving time corresponding to each alternative road level planning driving route. Assuming that estimated driving time corresponding to the route 1 is $t_1$, estimated driving time corresponding to the route 2 is $t_2$, and estimated driving time corresponding to the route 3 is $t_3$, where $t_2<t_1<t_3$, the route 2 is selected as the road level planning driving route of the vehicle.

Optionally, if information sent by the in-vehicle terminal further includes the heading information, the server determines the road level planning driving route of the vehicle with reference to the heading information. If the information sent by the in-vehicle terminal further includes the route constraint information, the server determines the road level planning driving route of the vehicle with reference to the route constraint information.

Second, the server determines the lane level planning driving route according to the road level planning driving route and information that is in the high-precision map information and that is related to lane planning.

The information that is in the high-precision map information and that is related to lane planning includes the lane static information and the lane dynamic information, and optionally, further includes availability information related to the lane, or the like.

In a possible implementation, this step includes, for each section of a road in the road level planning driving route, determining a lane selection solution of the vehicle on the section of the road according to lane static information and lane dynamic information that are corresponding to the section of the road; and determining the lane level planning driving route of the vehicle by integrating a lane selection solution of the vehicle on each section of the road. The lane selection solution of the vehicle on each section of the road includes at least one selected lane and a driving distance corresponding to each selected lane. In a process of lane level route planning, by considering the lane dynamic information including the lane traffic status and the like, a lane with a better road condition is selected, and a planned lane level planning driving route is more appropriate and efficient.

Figure 3C:
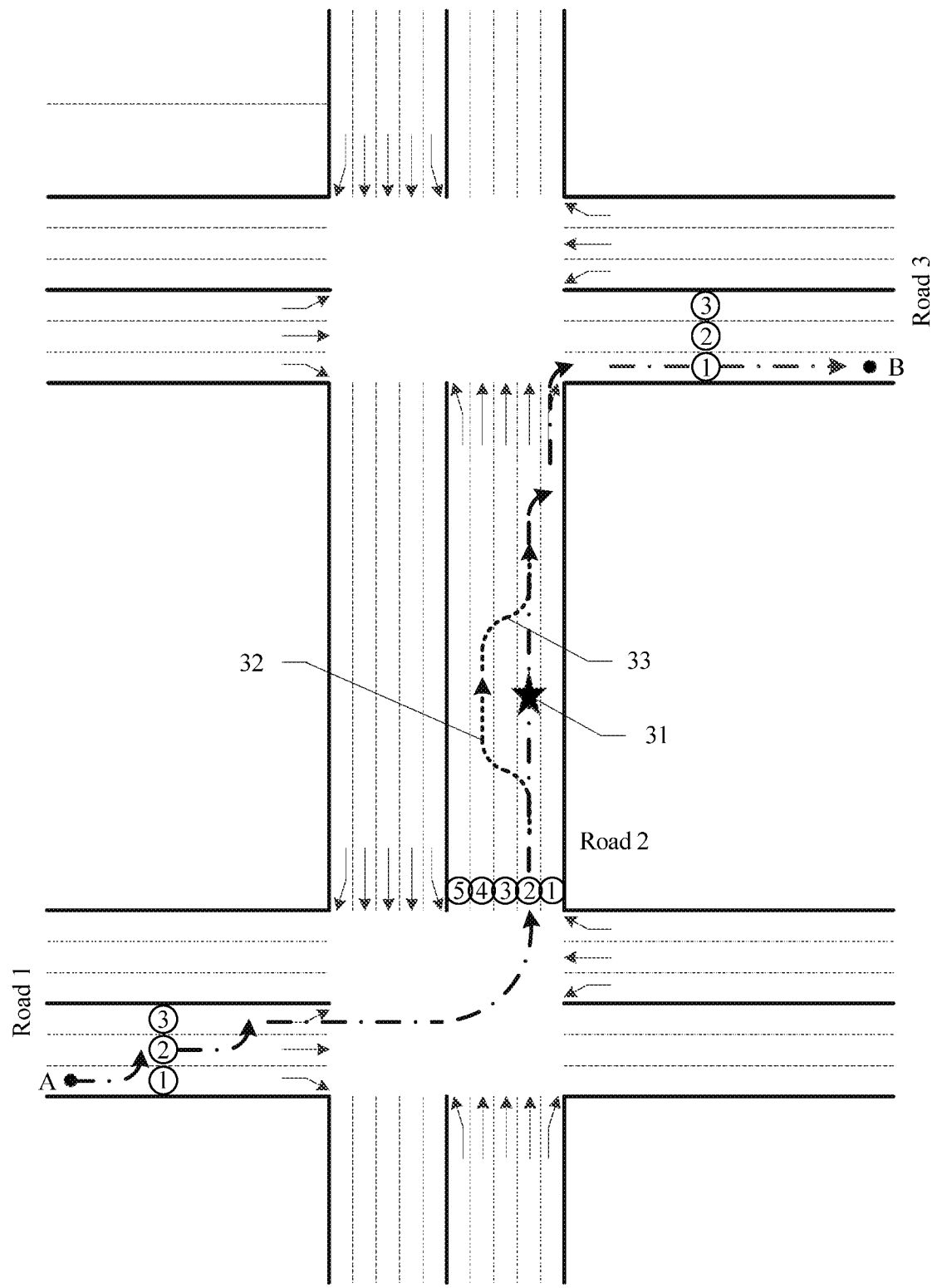
FIG. 3C is a schematic diagram of lane level route planning according to an embodiment shown in FIG. 3A-1 and FIG. 3A-2.

For example, with reference to FIG. 3C, it is assumed that the route 2 from the start location A to the destination location B successively includes a road 1, a road 2, and a road 3. The server separately determines the lane selection solution of the vehicle on each section of the road according to the lane static information and the lane dynamic information that are corresponding to each section of the road. For example, in the road 1, a lane selection solution includes a lane ① driving distance $s_1$, a lane ② driving distance $s_2$, and a lane ③ driving distance $s_3$; in the road 2, a lane selection solution includes a lane ② driving distance $s_4$ and a lane ① driving distance $s_5$; in the road 3, a lane selection solution includes a lane ① driving distance $s_6$. Then, the lane level planning driving route of the vehicle is determined by integrating the lane selection solution of the vehicle on each section of the road. The lane level planning driving route includes the lane ① driving distance $s_1$ of the road 1, the lane ② driving distance $s_2$ of the road 1, the lane ③ driving distance $s_3$ of the road 1, the lane ② driving distance $s_4$ of the road 2, the lane ① driving distance $s_5$ of the road 2, and the lane ① driving distance $s_6$ of the road 3.

In addition, in a process of planning the driving route for the vehicle, the availability information and/or the weather information included in the dynamic information may be considered, in order to plan a more appropriate driving route. For example, in the process of road level route planning, the availability information and/or the weather information is considered to select a more appropriate alternative road level planning driving route.

Step 307: The server sends the lane level planning driving route to the in-vehicle terminal.

After planning the lane level planning driving route of the vehicle, the server sends the lane level planning driving route to the in-vehicle terminal. Correspondingly, the in-vehicle terminal receives the lane level planning driving route of the vehicle from the server.

In a possible implementation, the server sends a route planning response to the in-vehicle terminal in response to the route planning request, and the route planning response includes at least the lane level planning driving route.

Optionally, the server further sends driving speed information to the in-vehicle terminal, and the driving speed information includes information that is used to indicate a driving speed of the vehicle on each section of a road and on each lane that are in the lane level planning driving route.

Step 308: The in-vehicle terminal controls, according to the obtained high-precision location, the vehicle to automatically drive according to the lane level planning driving route.

Further, the in-vehicle terminal generates a vehicle control command according to the obtained high-precision location and the lane level planning driving route. The high-precision location is a current location that is of the vehicle and that is obtained by the in-vehicle terminal in real time. The vehicle control command is used to control an actual driving route of the vehicle to constantly fit the lane level planning driving route. The vehicle control command includes but is not limited to at least one of the following: a steering control command, an acceleration control command, a brake control command, a vehicle light control command, a vehicle horn control command, a vehicle window control command, a wiper control command, or the like. The vehicle control command is updated in real time according to a latest high-precision location, so that the actual driving route of the vehicle constantly fits the lane level planning driving route.

In addition, as a replaceable manner of step 308, after receiving the lane level planning driving route of the vehicle from the server, the in-vehicle terminal provides a vehicle navigation service according to the lane level planning driving route. For example, the in-vehicle terminal provides the vehicle navigation service to the user in a voice broadcasting manner, so that the user drives the vehicle according to a broadcast voice and the lane level planning driving route.

Optionally, as shown in FIG. 3A-1 and FIG. 3A-2, this embodiment further includes the following step 309 to step 312.

Step 309: The server obtains update information of the dynamic information.

The dynamic information such as the road dynamic information, the lane dynamic information, the availability information, and the weather information is updated in real time according to an actual situation, and the server obtains the update information of the dynamic information.

Step 310: The server determines an affected road and/or lane according to the update information of the dynamic information.

The affected road and/or lane includes but is not limited to a congested road and/or lane, a road and/or lane that cannot be properly passed through, a road and/or lane whose speed limit is changed, or a road and/or lane whose heading is changed.

Step 311: The server determines a target vehicle according to the lane level planning driving route and high-precision location of each vehicle, where the target vehicle is a vehicle that needs to pass but has not passed the affected road and/or lane.

The in-vehicle terminal sends the high-precision location to the server in real time, for example, sends the high-precision location to the server once at the predetermined time interval. The two adjacent predetermined time intervals may be the same or may be different. The server determines, according to the lane level planning driving route and the high-precision location of each vehicle, the target vehicle that needs to pass but has not passed the affected road and/or lane.

Step 312: The server redetermines a start location of the target vehicle according to a high-precision location of the target vehicle. Then, the server performs step 306 again to replan a lane level planning driving route for the target vehicle.

Further, the server replans the lane level planning driving route for the target vehicle using a latest high-precision location of the target vehicle as the start location and with reference to a previously obtained destination location of the target vehicle and the high-precision map information. When the target vehicle needs to change a lane only, the server replans the lane level planning driving route for the target vehicle. When the target vehicle needs to change a road, the server replans a road level planning driving route for the target vehicle, and determines the lane level planning driving route of the vehicle according to the road level planning driving route and the information that is in the high-precision map information and that is related to lane planning. For a specific planning process, refer to descriptions in step 306, and details are not described herein again.

Then, the server sends the replanned lane level planning driving route to an in-vehicle terminal of the target vehicle. Correspondingly, the in-vehicle terminal of the target vehicle receives the replanned lane level planning driving route from the server. Optionally, the server further sends the driving speed information to the in-vehicle terminal of the target vehicle.

For example, it is assumed that the server obtains update information of a target lane on a closed target road from the traffic management agency using the data interface provided by the traffic management agency. The server identifies, in high-precision map information, the target lane on the target road as unavailable according to the update information. The server determines, according to the lane level planning driving route and the high-precision location of each vehicle, a target vehicle that needs to pass but has not passed the target lane on the target road. Then, the server replans a lane level planning driving route for the target vehicle. For example, assuming that the target lane is a left turn lane, the server detects whether another left turn lane exists on the target road. If the another left turn lane exists on the target road, the server determines that the target vehicle needs to change a lane only, and the server replans the lane level planning driving route for the target vehicle. If the another left turn lane does not exist on the target road, the server determines that the target vehicle needs to change a road; and the server replans a road level planning driving route for the target vehicle, and determines the lane level planning driving route of the vehicle according to the road level planning driving route and the information that is in the high-precision map information and that is related to lane planning. Then, the server sends the replanned lane level planning driving route to an in-vehicle terminal of the target vehicle.

In conclusion, according to the automatic driving navigation method provided in this embodiment, an in-vehicle terminal corrects satellite positioning data of a vehicle using a differential positioning correction received from a radio base station in a wireless network in order to obtain a high-precision location of the vehicle, and obtains a lane level planning driving route of the vehicle according to the high-precision location and by interacting with a server. This resolves problems that the prior art cannot implement round-the-clock positioning and navigation and positioning precision is affected because a 3D high-precision map has a difficulty in effectively adapting to an environment change. The high-precision location of the vehicle is obtained using a satellite differential positioning technology based on wireless network assistance. Positioning can be performed in various weather conditions, and round-the-clock and all-road-condition automatic driving navigation is implemented. In addition, the positioning precision does not need to rely on the 3D high-precision map, so that adaptability and reliability of the entire solution are significantly improved.

In addition, when the server performs route planning, a perception range is expanded from a line-of-sight range to an all road network range by integrating dynamic information, thereby implementing comprehensive vehicle scheduling of an entire city and helping resolve a traffic congestion problem in the city.

In addition, compared with the prior art that requires the 3D high-precision map, only a 2D high-precision map is required in the technical solution provided in this embodiment of the present disclosure, a 3D image of a fixed object such as a building or a landmark in an environment is not required, and a requirement for a high-precision map is reduced. In addition, various types of information required for route planning may be obtained from the 2D high-precision map, and a way to obtain the various types of information is greatly simplified.

It should be noted that in the foregoing method embodiment, a step on an in-vehicle terminal side may be separately implemented as an automatic driving navigation method on the in-vehicle terminal side, and a step on a server side may be separately implemented as an automatic driving navigation method on the server side.

It should further be noted that, as described above, in this embodiment of the present disclosure, the in-vehicle terminal may include one or both of two devices of an intelligent front-end device equipped in the vehicle and a terminal device independent of the vehicle. Therefore, in the foregoing method embodiment, for the step on the in-vehicle terminal side, an example in which each step is performed by only the in-vehicle terminal is used for description. In an actual application, when the in-vehicle terminal includes only the intelligent front-end device equipped in the vehicle, the intelligent front-end device equipped in the vehicle performs all steps on the in-vehicle terminal side. When the in-vehicle terminal includes only the terminal device independent of the vehicle, the terminal device independent of the vehicle performs all the steps on the in-vehicle terminal side. When the in-vehicle terminal includes both the intelligent front-end device equipped in the vehicle and the terminal device independent of the vehicle, the intelligent front-end device equipped in the vehicle performs some steps on the in-vehicle terminal side, and the terminal device independent of the vehicle performs other steps on the in-vehicle terminal side, that is, the two devices cooperate to complete all the steps on the in-vehicle terminal side. For example, the terminal device (such as a mobile phone) independent of the vehicle obtains a destination location provided by a user and sends the destination location to the server; the intelligent front-end device equipped in the vehicle obtains the high-precision location of the vehicle using the satellite differential positioning technology based on wireless network assistance, determines a start location of the vehicle according to the high-precision location of the vehicle, and sends the start location of the vehicle to the server; the server determines the lane level planning driving route according to the start location and the destination location and with reference to high-precision map information, and delivers the lane level planning driving route to the intelligent front-end device equipped in the vehicle; and the intelligent front-end device equipped in the vehicle controls, according to the obtained high-precision location, the vehicle to automatically drive according to the lane level planning driving route.

The following is an apparatus embodiment of the present disclosure. For details not disclosed in the apparatus embodiment of the present disclosure, refer to the method embodiment of the present disclosure.

Figure 4A:
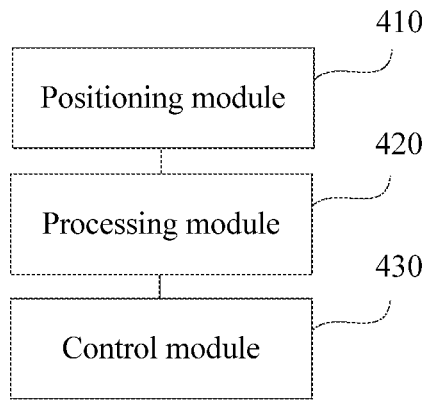
FIG. 4A is a block diagram of an automatic driving navigation apparatus according to an embodiment of the present disclosure.

Referring to FIG. 4A, FIG. 4A shows a block diagram of an automatic driving navigation apparatus according to an embodiment of the present disclosure. The automatic driving navigation apparatus may be implemented, using software, hardware, or a combination of the software and the hardware, as all or a part of an in-vehicle terminal 120 in an implementation environment shown in FIG. 1. The automatic driving navigation apparatus may include a positioning module 410, a processing module 420, and a control module 430.

The positioning module 410 is configured to obtain satellite positioning data of a vehicle, receive a differential positioning correction from a radio base station in a wireless network, and correct the satellite positioning data using the differential positioning correction to obtain a high-precision location of the vehicle. The high-precision location is location information whose positioning precision reaches a submeter level.

The processing module 420 is configured to obtain a lane level planning driving route of the vehicle from a server, where the lane level planning driving route is a route that is accurate to the submeter level and that is used to enable the vehicle to drive on a specified lane. The lane level planning driving route is determined by the server with reference to the high-precision location obtained by the positioning module 410 and high-precision map information, and the high-precision map information is used to provide information required for lane level route planning.

The control module 430 is configured to control, according to the high-precision location obtained by the positioning module 410, the vehicle to automatically drive according to the lane level planning driving route obtained by the processing module 420.

In conclusion, according to the automatic driving navigation apparatus provided in this embodiment, an in-vehicle terminal corrects satellite positioning data of a vehicle using a differential positioning correction received from a radio base station in a wireless network in order to obtain a high-precision location of the vehicle, and obtains a lane level planning driving route of the vehicle according to the high-precision location and by interacting with a server. This resolves problems that the prior art cannot implement round-the-clock positioning and navigation and positioning precision is affected because a 3D high-precision map has a difficulty in effectively adapting to an environment change. The high-precision location of the vehicle is obtained using a satellite differential positioning technology based on wireless network assistance. Positioning can be performed in various weather conditions, and round-the-clock and all-road-condition automatic driving navigation is implemented. In addition, the positioning precision does not need to rely on the 3D high-precision map, so that adaptability and reliability of the entire solution are significantly improved.

Figure 4B:
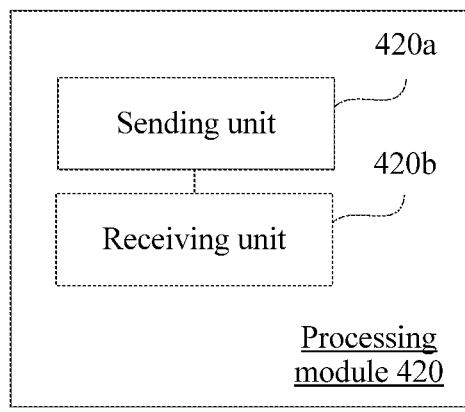
FIG. 4B is a block diagram of an obtaining module according to an embodiment shown in FIG. 4A.

In an optional embodiment provided based on the embodiment shown in FIG. 4A, as shown in FIG. 4B, the processing module 420 includes a sending unit 420a and a receiving unit 420b.

The sending unit 420a is configured to send a start location and a destination location of the vehicle to the server. The start location is determined by the in-vehicle terminal according to the high-precision location obtained by the positioning module 410.

The receiving unit 420b is configured to receive the lane level planning driving route of the vehicle from the server. The lane level planning driving route is determined by the server according to the start location, the destination location, and the high-precision map information. The high-precision map information includes static information and dynamic information, the static information includes information that is used to indicate a static distribution status of a road, a lane, and road infrastructure in a road network environment, and the dynamic information includes information that is used to indicate a real-time road condition of the road and the lane in the road network environment.

In another optional embodiment provided based on the embodiment shown in FIG. 4A, the differential positioning correction is obtained by means of solving by a central station according to RTK observed values obtained by at least three RTK reference stations and is provided to the radio base station. The central station and each RTK reference station are deployed in the wireless network, or the central station is deployed in the wireless network and each RTK reference station is deployed outside the wireless network, or the central station and each RTK reference station are deployed outside the wireless network.

In another optional embodiment provided based on the embodiment shown in FIG. 4A, the control module 430 is further configured to generate a vehicle control command according to the high-precision location obtained by the positioning module 410 and the lane level planning driving route obtained by the processing module 420. The vehicle control command is used to control an actual driving route of the vehicle to constantly fit the lane level planning driving route.

Figure 5A:
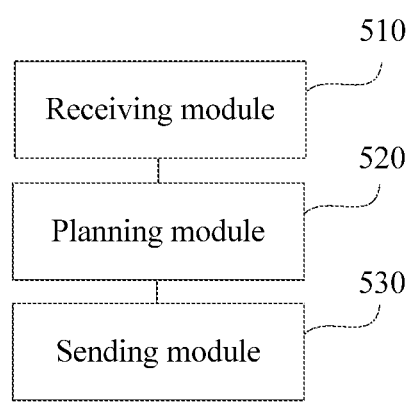
FIG. 5A is a block diagram of an automatic driving navigation apparatus according to another embodiment of the present disclosure.

Referring to FIG. 5A, FIG. 5A shows a block diagram of an automatic driving navigation apparatus according to another embodiment of the present disclosure. The automatic driving navigation apparatus may be implemented, using software, hardware, or a combination of the software and the hardware, as all or a part of a server 140 in an implementation environment shown in FIG. 1. The automatic driving navigation apparatus may include a receiving module 510, a planning module 520, and a sending module 530.

The receiving module 510 is configured to receive a start location and a destination location of a vehicle from an in-vehicle terminal. The start location is determined by the in-vehicle terminal according to a high-precision location of the vehicle, the high-precision location is location information whose positioning precision reaches a submeter level, and the high-precision location is obtained by correcting satellite positioning data of the vehicle using a differential positioning correction received from a radio base station in a wireless network.

The planning module 520 is configured to determine a lane level planning driving route according to the start location and the destination location received by the receiving module 510 and with reference to high-precision map information. The high-precision map information includes static information and dynamic information, the static information includes information that is used to indicate a static distribution status of a road, a lane, and road infrastructure in a road network environment, and the dynamic information includes information that is used to indicate a real-time road condition of the road and the lane in the road network environment. The lane level planning driving route is a route that is accurate to the submeter level and that is used to enable the vehicle to drive on a specified lane.

The sending module 530 is configured to send the lane level planning driving route determined by the planning module 520 to the in-vehicle terminal.

In conclusion, according to the automatic driving navigation apparatus provided in this embodiment, when the server performs route planning, a perception range is expanded from a line-of-sight range to an all road network range by integrating the dynamic information in the road network environment, thereby implementing comprehensive vehicle scheduling of an entire city and helping resolve a traffic congestion problem in the city.

Figure 5B:
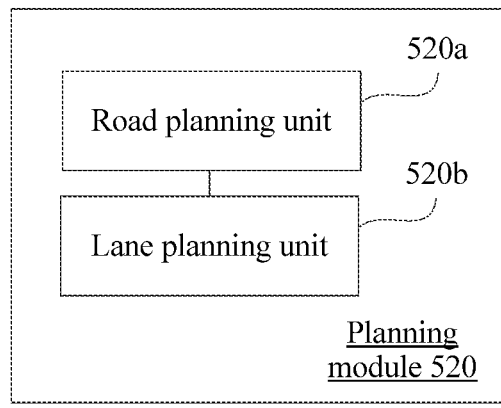
FIG. 5B is a block diagram of a planning module according to an embodiment shown in FIG. 5A.

In an optional embodiment provided based on the embodiment shown in FIG. 5A, as shown in FIG. 5B, the planning module 520 includes a road planning unit 520*a* and a lane planning unit 520*b*.

The road planning unit 520*a* is configured to determine a road level planning driving route according to the start location and the destination location received by the receiving module 510 and with reference to information that is in the high-precision map information and that is related to road planning. The road level planning driving route is a route that is used to enable the vehicle to drive on a specified road.

The lane planning unit 520*b* is configured to determine the lane level planning driving route according to the road level planning driving route determined by the road planning unit 520*a* and information that is in the high-precision map information and that is related to lane planning.

Figure 5C:
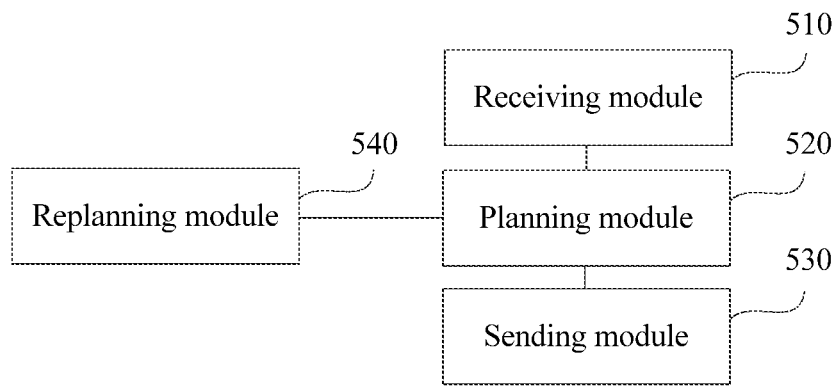
FIG. 5C is a block diagram of an automatic driving navigation apparatus according to another embodiment of the present disclosure.

In an optional embodiment provided based on the embodiment shown in FIG. 5A, as shown in FIG. 5C, the automatic driving navigation apparatus further includes a replanning module 540.

The replanning module 540 is further configured to obtain update information of the dynamic information; determine an affected road and/or lane according to the update information of the dynamic information; determine a target vehicle according to the lane level planning driving route and high-precision location of each vehicle, where the target vehicle is a vehicle that needs to pass but has not passed the affected road and/or lane; and redetermine a start location of the target vehicle according to a high-precision location of the target vehicle, and determine the lane level planning driving route again according to the start location, the destination location, and high-precision map information and using the planning module 520.

It should be noted that in the foregoing apparatus embodiments, the division of the foregoing functional modules is merely used as an example for description. In an actual application, the foregoing functions may be allocated to different functional modules for completion according to a requirement. That is, an internal structure of a device is divided into different functional modules in order to complete all or some of the functions described above. In addition, the automatic driving navigation apparatus provided in the foregoing embodiments pertains to a same concept as the method embodiments of the automatic driving navigation method. For a specific implementation process, refer to the method embodiments, and details are not described herein again.

Figure 6:
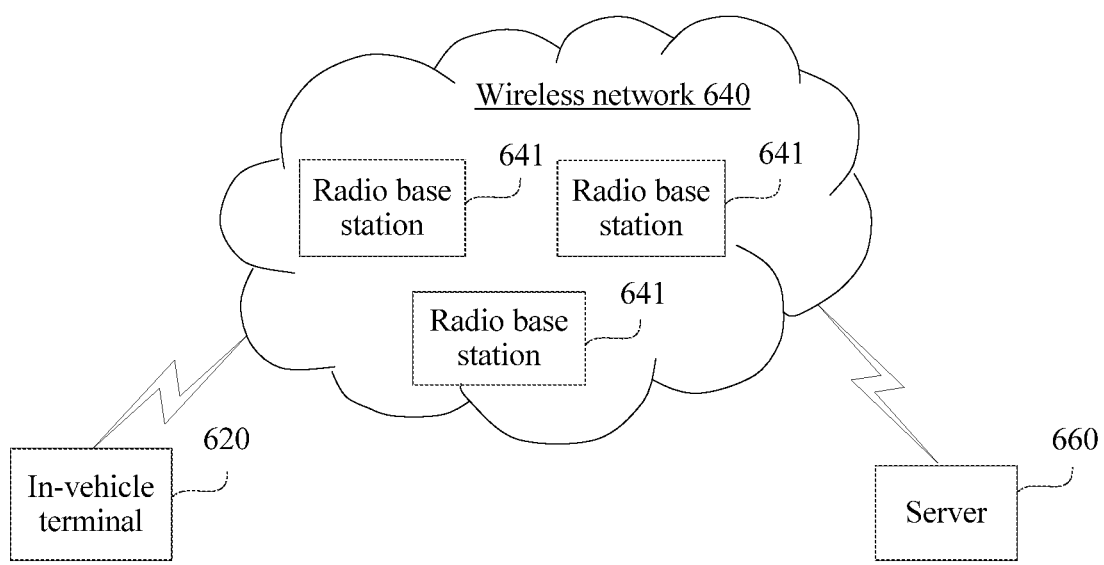
FIG. 6 is a block diagram of an automatic driving navigation system according to an embodiment of the present disclosure.

Referring to FIG. 6, FIG. 6 shows a block diagram of an automatic driving navigation system according to an embodiment of the present disclosure. The automatic driving navigation system includes an in-vehicle terminal 620, a wireless network 640, and a server 660. The in-vehicle terminal 620 and the server 660 establish a communication connection using the wireless network 640. The wireless network 640 includes at least one radio base station 641.

The radio base station 641 is configured to obtain a differential positioning correction and send the differential positioning correction to the in-vehicle terminal 620.

The in-vehicle terminal 620 is configured to obtain satellite positioning data of a vehicle, receive the differential positioning correction from the radio base station 641, and correct the satellite positioning data using the differential positioning correction to obtain a high-precision location of the vehicle. The high-precision location is location information whose positioning precision reaches a submeter level. The in-vehicle terminal 620 is further configured to send the high-precision location to the server 660.

The server 660 is configured to receive the high-precision location from the in-vehicle terminal 620, and determine a lane level planning driving route according to the high-precision location and with reference to high-precision map information. The lane level planning driving route is a route that is accurate to the submeter level and that is used to enable the vehicle to drive on a specified lane. The high-precision map information is used to provide information required for lane level route planning. The server 660 is further configured to send the lane level planning driving route to the in-vehicle terminal 620.

The in-vehicle terminal 620 is further configured to receive the lane level planning driving route from the server 660, and control, according to the high-precision location obtained in real time, the vehicle to automatically drive according to the lane level planning driving route.

In conclusion, according to the automatic driving navigation system provided in this embodiment, an in-vehicle terminal corrects satellite positioning data of a vehicle using a differential positioning correction received from a radio base station in a wireless network in order to obtain a high-precision location of the vehicle, and obtains a lane level planning driving route of the vehicle according to the high-precision location and by interacting with a server. This resolves problems that the prior art cannot implement round-the-clock positioning and navigation and positioning precision is affected because a 3D high-precision map has a difficulty in effectively adapting to an environment change. The high-precision location of the vehicle is obtained using a satellite differential positioning technology based on wireless network assistance. Positioning can be performed in various weather conditions, and round-the-clock and all-road-condition automatic driving navigation is implemented. In addition, the positioning precision does not need to rely on the 3D high-precision map, so that adaptability and reliability of the entire solution are significantly improved.

In an optional embodiment provided based on the embodiment shown in FIG. 6, the radio base station 641 is further configured to obtain the differential positioning correction from a central station. The central station is configured to obtain the differential positioning correction by means of solving according to RTK observed values obtained by at least three RTK reference stations. The central station and each RTK reference station are deployed in the wireless network, or the central station is deployed in the wireless network and each RTK reference station is deployed outside the wireless network, or the central station and each RTK reference station are deployed outside the wireless network.

Figure 7:
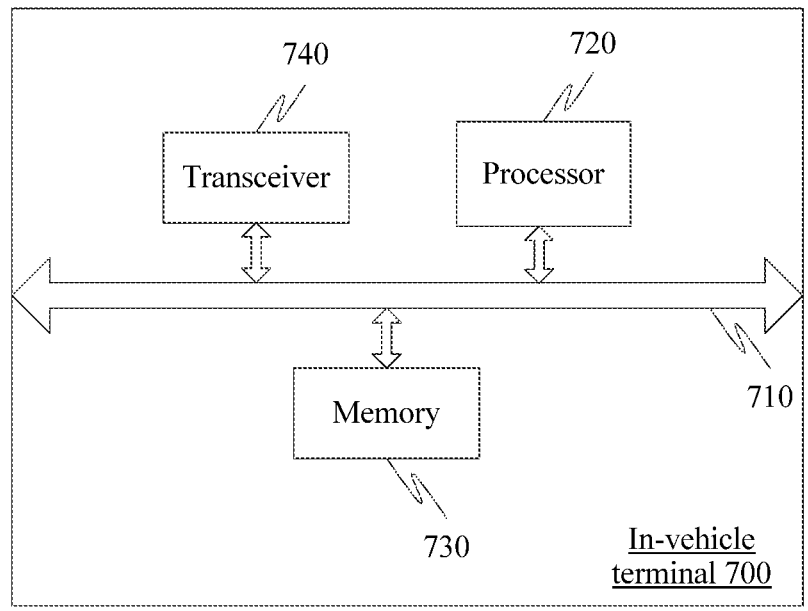
FIG. 7 is a block diagram of an in-vehicle terminal according to an embodiment of the present disclosure.

Referring to FIG. 7, FIG. 7 shows a block diagram of an in-vehicle terminal according to an embodiment of the present disclosure. As shown in FIG. 7, an in-vehicle terminal 700 includes a bus 710, and a processor 720, a memory 730, and a transceiver 740 that communicate using the bus 710. The memory 730 is configured to store one or more instructions, and the instruction is configured to be executed by the processor 720.

The processor 720 is configured to obtain satellite positioning data of a vehicle, control the transceiver 740 to receive a differential positioning correction from a radio base station in a wireless network, and correct the satellite positioning data using the differential positioning correction to obtain a high-precision location of the vehicle, where the high-precision location is location information whose positioning precision reaches a submeter level.

The processor 720 is further configured to control the transceiver 740 to obtain a lane level planning driving route of the vehicle from a server by means of interaction, where the lane level planning driving route is a route that is accurate to the submeter level and that is used to enable the vehicle to drive on a specified lane, the lane level planning driving route is determined by the server with reference to the high-precision location and high-precision map information, and the high-precision map information is used to provide information required for lane level route planning.

The processor 720 is further configured to control, according to the obtained high-precision location, the vehicle to automatically drive according to the lane level planning driving route.

In conclusion, according to the in-vehicle terminal provided in this embodiment, the in-vehicle terminal corrects satellite positioning data of a vehicle using a differential positioning correction received from a radio base station in a wireless network in order to obtain a high-precision location of the vehicle, and obtains a lane level planning driving route of the vehicle according to the high-precision location and by interacting with a server. This resolves problems that the prior art cannot implement round-the-clock positioning and navigation and positioning precision is affected because a 3D high-precision map has a difficulty in effectively adapting to an environment change. The high-precision location of the vehicle is obtained using a satellite differential positioning technology based on wireless network assistance. Positioning can be performed in various weather conditions, and round-the-clock and all-road-condition automatic driving navigation is implemented. In addition, the positioning precision does not need to rely on the 3D high-precision map, so that adaptability and reliability of the entire solution are significantly improved.

In an optional embodiment provided based on the embodiment shown in FIG. 7, the processor 720 is further configured to control the transceiver 740 to send a start location and a destination location of the vehicle to the server, where the start location is determined by the in-vehicle terminal according to the high-precision location; and control the transceiver 740 to receive the lane level planning driving route of the vehicle from the server, where the lane level planning driving route is determined by the server according to the start location, the destination location, and the high-precision map information, the high-precision map information includes static information and dynamic information, the static information includes information that is used to indicate a static distribution status of a road, a lane, and road infrastructure in a road network environment, and the dynamic information includes information that is used to indicate a real-time road condition of the road and the lane in the road network environment.

In another optional embodiment provided based on the embodiment shown in FIG. 7, the differential positioning correction is obtained by means of solving by a central station according to RTK observed values obtained by at least three RTK reference stations and is provided to the radio base station.

The central station and each RTK reference station are deployed in the wireless network, or the central station is deployed in the wireless network and each RTK reference station is deployed outside the wireless network, or the central station and each RTK reference station are deployed outside the wireless network.

In another optional embodiment provided based on the embodiment shown in FIG. 7, the processor 720 is further configured to generate a vehicle control command according to the obtained high-precision location and the lane level planning driving route, where the vehicle control command is used to control an actual driving route of the vehicle to constantly fit the lane level planning driving route.

Figure 8:
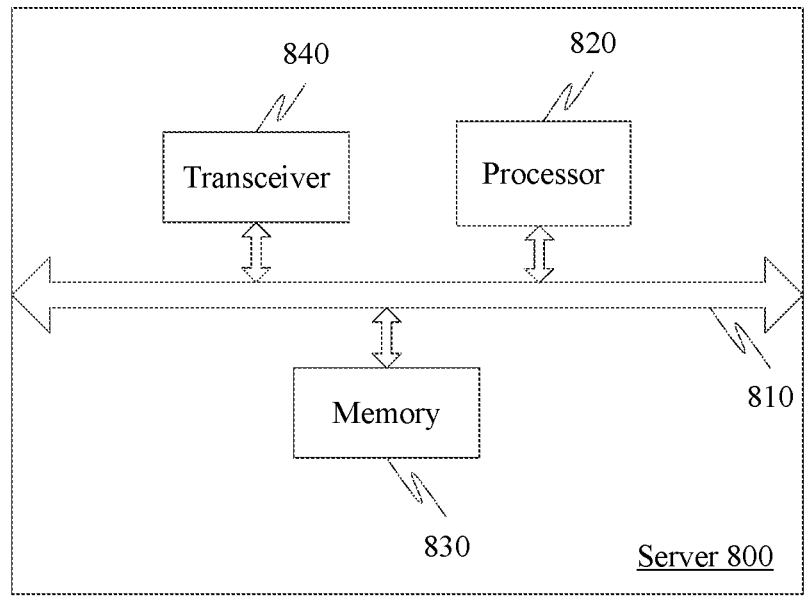
FIG. 8 is a block diagram of a server according to an embodiment of the present disclosure.

Referring to FIG. 8, FIG. 8 shows a block diagram of a server according to an embodiment of the present disclosure. As shown in FIG. 8, a server 800 includes a bus 810, and a processor 820, a memory 830, and a transceiver 840 that communicate using the bus 810. The memory 830 is configured to store one or more instructions, and the instruction is configured to be executed by the processor 820.

The processor 820 is configured to control the transceiver 840 to receive a start location and a destination location of a vehicle from an in-vehicle terminal, where the start location is determined by the in-vehicle terminal according to a high-precision location of the vehicle, the high-precision location is location information whose positioning precision reaches a submeter level, and the high-precision location is obtained by correcting satellite positioning data of the vehicle using a differential positioning correction received from a radio base station in a wireless network.

The processor 820 is further configured to determine a lane level planning driving route according to the start location, the destination location, and high-precision map information, where the high-precision map information includes static information and dynamic information, the static information includes information that is used to indicate a static distribution status of a road, a lane, and road infrastructure in a road network environment, the dynamic information includes information that is used to indicate a real-time road condition of the road and the lane in the road network environment, and the lane level planning driving route is a route that is accurate to the submeter level and that is used to enable the vehicle to drive on a specified lane.

The processor 820 is further configured to control the transceiver 840 to send the lane level planning driving route to the in-vehicle terminal.

In conclusion, according to the server provided in this embodiment, when route planning is performed, a perception range is expanded from a line-of-sight range to an all road network range by integrating the dynamic information in the road network environment, thereby implementing comprehensive vehicle scheduling of an entire city and helping resolve a traffic congestion problem in the city.

In an optional embodiment provided based on the embodiment shown in FIG. 8, the processor 820 is further configured to determine a road level planning driving route according to the start location, the destination location, and information that is in the high-precision map information and that is related to road planning, where the road level planning driving route is a route that is used to enable the vehicle to drive on a specified road; and determine the lane level planning driving route according to the road level planning driving route and information that is in the high-precision map information and that is related to lane planning.

In another optional embodiment provided based on the embodiment shown in FIG. 8, the processor 820 is further configured to obtain update information of the dynamic information; determine an affected road and/or lane according to the update information of the dynamic information; determine a target vehicle according to the lane level planning driving route and high-precision location of each vehicle, where the target vehicle is a vehicle that needs to pass but has not passed the affected road and/or lane; and redetermine a start location of the target vehicle according to a high-precision location of the target vehicle, and perform a step of determining a lane level planning driving route according to the start location, the destination location, and high-precision map information again.

It should be understood that a singular form "one" ("a", "an", and "the") used in this specification is intended to further include a plural form unless the context clearly supports an otherwise case. It should also be understood that "and/or" used in this specification indicates any or all possible combinations including one or more related listed items.

The sequence numbers of the foregoing embodiments of the present disclosure are merely for illustrative purposes, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may include a read-only memory, a magnetic disk, or an optical disc.

The foregoing descriptions are merely example embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. An automatic driving navigation method, applied to an in-vehicle terminal, the method comprising:
   obtaining satellite positioning data of a vehicle;
   receiving a differential positioning correction from a radio base station in a wireless network;
   correcting the satellite positioning data using the differential positioning correction to obtain a high-precision location of the vehicle, the high-precision location is location information whose positioning precision reaches a submeter level;
   obtaining a lane level planning driving route of the vehicle from a server, the lane level planning driving route being a route that is accurate to the submeter level and used to enable the vehicle to drive on a specified lane, the lane level planning driving route being determined by the server with reference to the high-precision location and high-precision map information, and the high-precision map information being used to provide information required for lane level route planning;
   controlling, according to the obtained high-precision location, the vehicle to automatically drive according to the lane level planning driving route, and
   sending, by the in-vehicle terminal, a correction obtaining request to the radio base station, the radio base station sending a last obtained differential positioning correction to the in-vehicle terminal in response to the correction obtaining request, the last obtained differential positioning correction being set as the differential positioning correction.

2. The method of claim 1, wherein obtaining the lane level planning driving route of the vehicle from the server comprises:
   sending a start location and a destination location of the vehicle to the server, the start location being determined by the in-vehicle terminal according to the high-precision location; and
   receiving the lane level planning driving route of the vehicle from the server, the lane level planning driving route being determined by the server according to the start location, the destination location, and the high-precision map information, the high-precision map information comprising static information and dynamic information, the static information comprising information used to indicate a static distribution status of a road, a lane, and road infrastructure in a road network environment, and the dynamic information comprising information used to indicate a real-time road condition of the road and the lane in the road network environment.

3. The method of claim 1, wherein the differential positioning correction is obtained by solving by a central station according to real-time kinematic (RTK) observed values obtained by at least three RTK reference stations and is provided to the radio base station, the central station and each RTK reference station are deployed in the wireless network.

4. The method of claim 1, wherein the differential positioning correction is obtained by solving by a central station according to real-time kinematic (RTK) observed values obtained by at least three RTK reference stations and is provided to the radio base station, the central station is deployed in the wireless network and each RTK reference station is deployed outside the wireless network.

5. The method of claim 1, wherein the differential positioning correction is obtained by solving by a central station according to real-time kinematic (RTK) observed values obtained by at least three RTK reference stations and is provided to the radio base station, the central station and each RTK reference station are deployed outside the wireless network.

6. The method of claim 1, wherein controlling, according to the obtained high-precision location, the vehicle to automatically drive according to the lane level planning driving route comprises generating a vehicle control command according to the obtained high-precision location and the lane level planning driving route, the vehicle control command being used to control an actual driving route of the vehicle to constantly fit the lane level planning driving route.

7. The method of claim 1, wherein the radio base station broadcasts, at a predetermined time interval, the differential positioning correction to the in-vehicle terminal.

8. An automatic driving navigation system, comprising:
an in-vehicle terminal configured to obtain satellite positioning data of a vehicle;
a wireless network comprising at least one radio base station, the at least one radio base station being configured to obtain a differential positioning correction and send the differential positioning correction to the in-vehicle terminal, and
a server establishing a communication connection with the in-vehicle terminal using the wireless network,
the in-vehicle terminal being configured to;
receive the differential positioning correction from the at least one radio base station;
correct the satellite positioning data of the vehicle using the differential positioning correction to obtain a high-precision location of the vehicle, the high-precision location being location information whose positioning precision reaches a submeter level; and
send the high-precision location to the server, the server being configured to:
receive the high-precision location from the in-vehicle terminal;
determine a lane level planning driving route according to the high-precision location and with reference to high-precision map information, the lane level planning driving route being a route that is accurate to the submeter level and used to enable the vehicle to drive on a specified lane, and the high-precision map information being used to provide information required for lane level route planning; and
send the lane level planning driving route to the in-vehicle terminal, and the in-vehicle terminal being further configured to:
receive the lane level planning driving route from the server; and
control, according to the obtained high-precision location, the vehicle to automatically drive according to the lane level planning driving route,
wherein the radio base station is further configured to obtain the differential positioning correction from a central station, and the central station is configured to obtain the differential positioning correction by solving according to real-time kinematic (RTK) observed values obtained by at least three RTK reference stations, and
the central station and each RTK reference station are deployed in the wireless network, or the central station is deployed in the wireless network and each RTK reference station is deployed outside the wireless network, or the central station and each RTK reference station are deployed outside the wireless network.

9. An in-vehicle terminal, comprising:
a transceiver;
a memory configured to store one or more instructions; and
a processor coupled to the memory and the transceiver, and configured to execute the one or more instructions and cause the processor to:
obtain satellite positioning data of a vehicle;
control the transceiver to receive a differential positioning correction from a radio base station in a wireless network;
correct the satellite positioning data of the vehicle using the differential positioning correction to obtain a high-precision location of the vehicle, the high-precision location being location information whose positioning precision reaches a submeter level;
control the transceiver to obtain a lane level planning driving route of the vehicle from a server, the lane level planning driving route being a route that is accurate to the submeter level and used to enable the vehicle to drive on a specified lane, the lane level planning driving route being determined by the server with reference to the high-precision location and high-precision map information, and the high-precision map information being used to provide information required for lane level route planning; and
control, according to the obtained high-precision location, the vehicle to automatically drive according to the lane level planning driving route,
wherein the differential positioning correction is obtained by solving by a central station according to real-time kinematic (RTK) observed values obtained by at least three RTK reference stations and is provided to the radio base station, and the central station and each RTK reference station are deployed in the wireless network, or the central station is deployed in the wireless network and each RTK reference station is deployed outside the wireless network, or the central station and each RTK reference station are deployed outside the wireless network.

10. The in-vehicle terminal of claim 9, wherein the processor is further configured to:
control the transceiver to send a start location and a destination location of the vehicle to the server, the start location being determined by the in-vehicle terminal according to the high-precision location; and
control the transceiver to receive the lane level planning driving route of the vehicle from the server, the lane level planning driving route being determined by the server according to the start location, the destination location, and the high-precision map information, the high-precision map information comprising static information and dynamic information, the static information comprising information used to indicate a static distribution status of a road, a lane, and road infrastructure in a road network environment, and the dynamic information comprising information used to indicate a real-time road condition of the road and the lane in the road network environment.

11. The in-vehicle terminal of claim 9, wherein the processor is further configured to generate a vehicle control command according to the obtained high-precision location and the lane level planning driving route, the vehicle control command being used to control an actual driving route of the vehicle to constantly fit the lane level planning driving route.

* * * * *